(12) United States Patent
Kläser-Jenewein et al.

(10) Patent No.: US 10,801,866 B2
(45) Date of Patent: Oct. 13, 2020

(54) MEASURING DEVICE FOR A COMBUSTIBLE GAS SUPPLY DEVICE FOR AN INTERNAL COMBUSTION ENGINE HAVING A DOUBLE-WALLED CONBUSTIBLE GAS LINE

(71) Applicant: MTU FRIEDRICHSHAFEN GMBH, Friedrichshafen (DE)

(72) Inventors: Ludwig Kläser-Jenewein, Frickingen (DE); Ulrich Meyer, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 54 days.

(21) Appl. No.: 16/085,197

(22) PCT Filed: Mar. 21, 2017

(86) PCT No.: PCT/EP2017/000357
§ 371 (c)(1),
(2) Date: Sep. 14, 2018

(87) PCT Pub. No.: WO2017/162333
PCT Pub. Date: Sep. 28, 2017

(65) Prior Publication Data
US 2019/0072418 A1  Mar. 7, 2019

(30) Foreign Application Priority Data
Mar. 22, 2016 (DE) .................. 10 2016 204 764

(51) Int. Cl.
*G01D 11/24* (2006.01)
*G01K 1/14* (2006.01)
(Continued)

(52) U.S. Cl.
CPC .......... *G01D 11/245* (2013.01); *G01D 11/24* (2013.01); *G01D 11/30* (2013.01); *G01K 1/14* (2013.01);
(Continued)

(58) Field of Classification Search
None
See application file for complete search history.

(56) References Cited

U.S. PATENT DOCUMENTS 1,559,547 A    11/1925  Brown
2008/0271549 A1  11/2008  Endres et al.
(Continued)

FOREIGN PATENT DOCUMENTS

DE    20205242 U1    6/2002
DE    10357222 A1    6/2005
(Continued)

*Primary Examiner* — Harshad R Patel
(74) *Attorney, Agent, or Firm* — Lucas & Mercanti, LLP; Klaus P. Stoffel

(57) ABSTRACT

A measuring device for measuring a physical property of a fluid, including a base body which is closed along a peripheral line. The base body surrounds a first recess passing through the base body in the axial direction and the base body includes at least one second recess passing through the base body in the axial direction recess. At least one sensor device, which can be associated with the base body, can be bought into contact with the first recess.

12 Claims, 1 Drawing Sheet

(51) Int. Cl.
*G01D 11/30* (2006.01)
*G01K 13/02* (2006.01)
*G01L 19/00* (2006.01)

(52) U.S. Cl.
CPC .......... *G01K 13/02* (2013.01); *G01L 19/0007* (2013.01); *G01K 2013/024* (2013.01)

(56) References Cited

U.S. PATENT DOCUMENTS

| | | | |
|---|---|---|---|
| 2010/0162708 A1* | 7/2010 | Erickson | F02C 7/232 60/734 |
| 2010/0319655 A1* | 12/2010 | McClendon | F02B 19/08 123/279 |
| 2012/0216608 A1* | 8/2012 | Schleif | F01D 17/08 73/112.01 |
| 2014/0283788 A1* | 9/2014 | Bleyer | F02D 41/22 123/445 |

FOREIGN PATENT DOCUMENTS

| | | |
|---|---|---|
| DE | 102008032833 A1 | 1/2010 |
| EP | 0344576 A2 | 12/1989 |

* cited by examiner

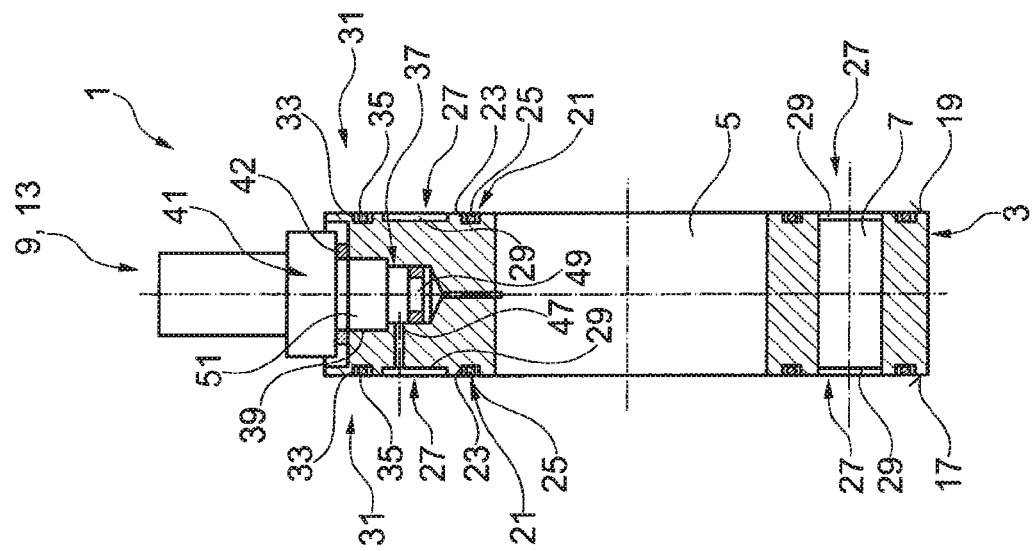
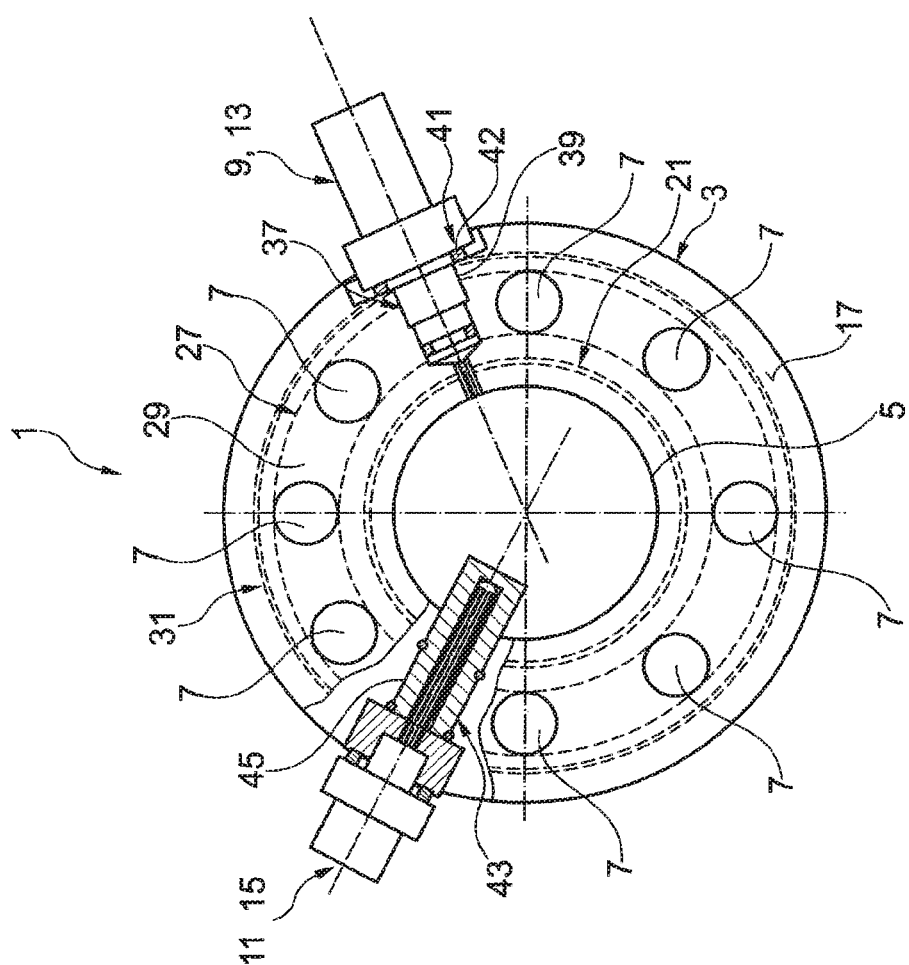

MEASURING DEVICE FOR A COMBUSTIBLE GAS SUPPLY DEVICE FOR AN INTERNAL COMBUSTION ENGINE HAVING A DOUBLE-WALLED CONBUSTIBLE GAS LINE

CROSS-REFERENCE TO RELATED APPLICATIONS

The present application is a 371 of International application PCT/EP2017/000357, flied Mar. 21, 2017, which claims priority of DE 10 2016 204 764.7, filed Mar. 22, 2016, the priority of these applications is hereby claimed and these applications are incorporated herein by reference.

BACKGROUND OF THE INVENTION

The invention relates to a measuring device for measuring at least one physical property of a fluid, to a combustible gas supply device for an internal combustion engine with said type of measuring device, and to an internal combustion engine with said type of combustible gas supply device.

For internal combustion engines which are operated with a combustible gas, especially for marine applications, but also in the stationary sector, special safety regulations apply. Double-walled protection systems for combustible gas lines of a combustible gas supply device are often prescribed here to ensure the safety of machine rooms. Moreover, combustible gas supply devices, especially those for internal combustion engines, are associated with pressure and temperature as the decisive control and monitoring variables. Sensors provided for the measurement of such physical variables are typically arranged within an outer wall of a double-walled combustible gas line, making it necessary, on the one hand, to provide hermetically sealed leadthroughs for the cabling of such sensors and, on the other hand, to embody the sensors themselves with explosion protection. The measuring systems suitable for this purpose are about 20 times more expensive than conventional sensors without explosion protection. Moreover, the arrangement of sensors within the outer wall of a double-walled combustible gas line has proved to be complex and expensive in terms of manufacture. Especially in the sector of double-walled gas lines, there is therefore a need for a simple measuring device which is inexpensive and simple to implement and can be checked and is accessible from the outside.

SUMMARY OF THE INVENTION

It is the underlying object of the invention to provide a measuring device, a combustible gas supply device for an internal combustion engine with said type of measuring device, and an internal combustion engine with said type of combustible gas supply device, wherein the disadvantages mentioned do not arise.

In particular, the object is achieved by providing at least one measuring device for measuring a physical property of a fluid which has a main body that is closed along a peripheral line. The main body surrounds a first aperture, which passes through the main body in the axial direction, wherein the main body also has at least one second aperture, which passes through the main body in the axial direction. At least one sensor device for measuring the at least one physical property, which can be brought into operative connection with the first aperture, can be assigned to the main body. By virtue of the fact that the main body has the first aperture and the second aperture, it is possible, in particular, for it to be inserted into a double-walled fluid line, in particular a combustible gas line, wherein a first, combustible fluid, in particular combustible gas, can be passed through the first aperture, and wherein a second, noncombustible fluid, in particular an inert gas or purging air, can be passed through the second aperture. By virtue of the fact that the main body can have the at least one sensor device and that the latter can be brought into operative connection with the first aperture, there is no need for arrangement of the sensor device within an outer wall of a double-walled line, and therefore it is possible to dispense with hermetically sealed leadthroughs, wherein it is also possible to use a sensor device which is embodied without explosion protection. This makes it possible to arrange the sensor device on the measuring device in a simple and low-cost manner, and it can also be embodied in a cost-saving way. The second aperture is fluidically separated from the first aperture, at least when the sensor device is mounted on the main body. In this way, the first fluid and the second fluid can be passed separately through the measuring device.

Here, a physical property of a fluid is understood, in particular, to mean a physical variable which describes a state of the fluid, in particular a thermodynamic state variable of the fluid. As a particular preference, a physical property of the fluid is understood to mean a pressure and/or a temperature of the fluid.

A peripheral line is understood, in particular, to mean a line which extends around the axial direction of the main body, wherein the peripheral line is preferably a closed peripheral line. It can be a circular peripheral line which preferably extends concentrically around the axial direction. However, other forms of peripheral line, along which the main body is formed in a closed manner, are also possible, e.g. oval or elliptical, polygonal, in particular rectangular or square, or even hexagonal geometries. The course of the peripheral line preferably determines a shape which the main body has in plan view, i.e. when viewed along the axial direction.

The axial direction is understood, in particular, to mean a direction in which a fluid flows through the main body in use as intended.

The first aperture is preferably formed centrally in the main body, in particular forming a central aperture in the main body. It is possible for the first aperture to be round, in particular circular, in plan view; however, other peripheral shapes of the aperture are also possible. The first aperture passes through the main body and is therefore preferably designed as a through hole.

The second aperture is also preferably designed as a through hole and is preferably likewise of round design, in particular of circular design, in plan view. A passage area of the second aperture is preferably smaller than a passage area of the first aperture. In particular, the second aperture preferably has a smaller diameter than the first aperture. The second aperture is preferably arranged radially to the outside of the first aperture. Here, the radial direction is understood to mean a direction which is perpendicular to the axial direction and intersects the latter, wherein, in particular, it is also perpendicular to the peripheral line. Since the main body surrounds the first aperture, said aperture is as it were arranged in an interior of the main body. The term "radially outward" accordingly refers to a direction which is away from the interior of the main body, and therefore the second aperture is at a greater distance from an imaginary central axis arranged in the interior of the main body than the first aperture, wherein the imaginary central axis preferably extends through a center of the first aperture.

The statement that the second aperture is fluidically separated from the first aperture means, in particular, that the measuring device is embodied in such a way that there is no fluid connection between the first aperture and the second aperture, at least in the mounted state of the at least one sensor device.

A sensor device is understood, in particular, to mean a device which is suitable for measuring the at least one physical property of the fluid, in particular a thermodynamic state variable thereof.

In a preferred illustrative embodiment, the main body is assigned at least one sensor device, which is in operative connection with the first aperture. In this case, the measuring device thus has the sensor device. However, it is also possible, in particular, for the measuring device to be designed to have the sensor device without it actually already having the sensor device.

In plan view, the main body preferably has a round, in particular circular, shape. This represents a particularly simple shape of the main body which can be produced at particularly low cost and which, at the same time, is highly versatile, especially because pipes for a combustible gas supply are typically also of circular design when viewed in cross section.

According to a development of the invention, it is envisaged that the main body has a plurality of second apertures, which are preferably arranged around the first aperture. Thus, overall, a larger passage area for a second fluid passed through the second apertures can be provided without the cross-sectional area of the individual second apertures having to be enlarged as a consequence. If the second apertures are arranged around the first aperture, they can directly connect outer chambers of the double-walled pipe to one another, while the first aperture can connect inner chambers of the pipe to one another. The second apertures are preferably arranged concentrically around the first aperture. As a particular preference, they are arranged on a circular line around the first aperture, in particular in a symmetrical or uniformly distributed manner. In a preferred illustrative embodiment, the main body has three, four, six, eight, ten or twelve second apertures.

A first fluid connection is preferably provided between at least two second apertures and, as a particular preference, all the second apertures are in a first fluid connection with one another. In this way, the second apertures can communicate with one another, and a fluid passing through the second apertures can also be transferred to other points of the main body via the first fluid connection. A first fluid connection of this kind can be set up at the end of the main body, for example. However, t is also possible for a first fluid connection of this kind to be formed on the inside, i.e. in an interior of the main body, e.g. as an inner ring line around the first aperture, especially if the main body is produced by primary forming, e.g. by sintering, metal powder injection molding and/or by a generative manufacturing process.

According to a development of the invention, it is envisaged that the main body has two ends, namely a first end and a second end, which—when viewed in the axial direction—faces away from the first end. The first aperture and the at least one second aperture each open into the two ends. Here, an end is understood, in particular, to mean a side or surface which delimits the main body and to which the axial direction is substantially perpendicular, preferably perpendicular. The statement that the first aperture and the at least one second aperture open into the end means, in particular, that the first aperture and the at least one second aperture pass completely through the main body along the axial direction, that is to say, in particular, are designed as through holes.

Provision is preferably made for a first sealing device to be arranged on at least one of the ends, between the first aperture and the at least one second aperture—when viewed in the radial direction. In this way, the first aperture and the second aperture can be sealed with respect to one another, at least when the sensor device is mounted. The first sealing device is preferably designed as an encircling sealing device, when viewed in the peripheral direction. In particular, the first sealing device preferably has a first annular groove, in which a flexible seal, in particular an O-ring, can be arranged. The first sealing device preferably has a first O-ring, which is arranged in the first annular groove.

As an alternative or in addition, provision is preferably made for the main body to have at least two second apertures, wherein the first fluid connection between the at least two second apertures is formed at at least one of the two ends. The first fluid connection between at least two second apertures can be formed in a particularly simple manner at the end, in particular by machining of the main body, but also by primary forming. In particular, the first fluid connection can be designed as a groove which connects the at least two second apertures, in particular as a second annular groove extending in the peripheral direction, preferably an encircling groove.

As an alternative or in addition, provision is preferably made for a second sealing device to be arranged radially outside the at least one second aperture at at least one of the two ends. The term "radially outside" means that the second sealing device is further away from the imaginary central axis of the measuring device than the at least one second aperture. In this way, the entire arrangement of apertures, namely of the first and second apertures, can be sealed with respect to an external environment of the measuring device by means of the second sealing device. When viewed in the peripheral direction, the second sealing device is preferably of encircling design. In particular, it can have a groove, preferably a third annular groove, in which a flexible seal, in particular an O-ring, can be arranged. The second sealing device preferably has a second O-ring, which is arranged in the third annular groove, which is an encircling groove when viewed in the peripheral direction.

As a particular preference, the measuring device has both the first sealing device and the second sealing device. Sealing, in particular by means of two concentrically arranged sealing devices, in particular by means of two concentrically arranged O-rings in concentric sealing ring grooves, is then possible. This provides for very good sealing of the measuring device.

According to a development of the invention, it is envisaged that the main body has at least one radial hole to receive the at least one sensor device. The at least one sensor device can then be arranged in a simple manner radially on the main body. The radial hole is preferably designed as a threaded hole, thus enabling the sensor device to be screwed into the radial hole in a simple and simultaneously stable and secure manner. The radial hole is preferably in fluid communication with the first aperture. Depending on the embodiment of the sensor device, it is possible for the radial hole to be designed as a stepped hole, wherein, in particular, it can have a larger-diameter region for receiving the sensor device and a smaller-diameter region for connecting the larger-diameter region fluidically to the first aperture. This embodiment is preferred, in particular, when the sensor device is designed as a pressure sensor which is fluidically connected to the first aperture via the smaller-diameter region of the radial hole. The radial hole designed as a threaded hole preferably has a load bearing thread length in accordance with an IEC standard applicable on the date which determines the priority of the present application. As a further preference, at least two, preferably more than two, additional loadbearing thread flights are provided, with the result that, if there is unintentional release of the sensor device, there is first of all an audible pressure drop without the sensor device already being expelled owing to an internal pressure in the first aperture.

According to a development of the invention, it is envisaged that the at least one radial hole is in a second fluid connection with the at least one second aperture. In particular, a stub channel between the radial hole and the at least one second aperture or between the radial hole and the first fluid connection between at least two second apertures, in particular a stub channel to an end groove connecting the second apertures, is preferably provided. However, it is also possible for the radial hole to be connected directly to the first fluid connection between at least two second apertures, in particular if—especially in the case of main bodies produced by primary forming—the first fluid connection is formed on the inside, During the operation of the measuring device, in particular an inert gas or purging gas, especially purging air, flows along the second aperture, wherein it is possible for the pressure in the second aperture to be higher than a pressure in the first aperture, especially in the case of an inert gas, or lower, especially in the case of purging air, By means of the second fluid connection to the at least one second aperture, the radial hole is purged, wherein, in the case of a leak, inert gas can flow into the first aperture via the second fluid connection and the radial hole, or gas can flow out of the first aperture, which enters the radial hole, via the second fluid connection into the second aperture, depending on pressure conditions. An explosion-protected embodiment of the measuring device which is secure with respect to the outside is thereby created while maintaining the double-walled principle even in the region of the sensor device.

According to a development of the invention, it is envisaged that the measuring device has a pressure sensor as the at least one sensor device. Thus, the measuring device has a sensor device which is designed as a pressure sensor. As an alternative or in addition, the measuring device preferably has a temperature sensor as the at least one sensor device. By means of the pressure and/or the temperature, it is possible to detect significant thermodynamic state variables of a fluid passing through the first aperture by means of the measuring device.

The pressure sensor is preferably designed as an absolute pressure sensor. In this case, it has, in particular, a measuring diaphragm at the end, which is in fluid connection with the first aperture during the operation of the measuring device, wherein the measuring diaphragm communicates on its side facing away from the first aperture with a chamber that has been evacuated or filled with an inert gas, in particular with nitrogen under low pressure, which is designed as a supporting space for the diaphragm. By means of the chamber that has been evacuated or filled under low pressure with inert gas, the pressure sensor itself implements the principle of double-walled construction—particularly in the region of the radial hole of the measuring device—with the result that the measuring device overall satisfies high safety requirements. The pressure sensor is preferably designed as a piezoresistive pressure sensor, as a capacitive pressure sensor or as a pressure sensor of some other type. It preferably has electrical insulation between an electric measuring sensor system and an electric supply voltage, or it is designed as what is referred to as a simple electrical device, wherein a service current, a service voltage and/or a capacitance do/does not exceed predetermined limit values. In particular, the pressure sensor is sealed on both sides—i.e., radially with respect to the inside and with respect to the outside—by means of suitable sealing devices, preferably O-rings and/or by its thread, with the result that, in this respect too, the principle of double-walled construction is also implemented by means of the pressure sensor.

The temperature sensor preferably has a protective sleeve, which separates a measuring element proper of the temperature sensor from the fluid flowing in the first aperture. In this way, the temperature sensor itself also implements the principle of double-walled construction. In addition, the temperature sensor is preferably designed as a simple electrical device or embodied with electrical insulation.

The sensor device preferably has a double seal, which makes an additional contribution to the safety of the measuring device. The receptacle for the sensor device, in particular the radial hole, satisfies the requirement for flame propagation sealing both in a guiding region and in a thread region. In particular, the thread designs on the sensor device and the radial hole are preferably implemented in accordance with DIN standard DIN EN 600794, Equipment protection by flameproof enclosures "d", in the version which applied on the date which determines the priority of the present application. The thread fit is preferably designed according to ISO 965-3 in the version which applied on the date which determines the priority of the present application.

According to a development of the invention, it is envisaged that the main body is designed as a flange for arrangement between two pipe sections, wherein the pipe sections each have a first and a second chamber, wherein the first chambers are fluidically separated from the second chambers. The first aperture of the main body is designed for fluid connection of the first chambers of the pipe sections, and the at least one second aperture is designed for fluid connection of the second chambers of the pipe sections. The main body designed as a flange is thus configured, in particular, to connect two double-walled pipe sections, in particular of a combustible gas line. In a double-walled pipe of this kind, a combustible gas is preferably passed through a first, inert chamber, wherein the first, inner chamber is surrounded in a ring shape by a second, outer chamber radially toward the outside, wherein an inert gas is arranged or purging air flows in the second, outer chamber. If air is provided as the purging gas here, purging preferably involves changing the volume 30 times over. In this case, provision is preferably made for the purging gas pressure in the second chamber to be lower than the combustible gas pressure in the first chamber. The measuring device bridges both chambers of the pipe sections and, accordingly, implements the principle of double-walled construction even in the region of the measuring device itself.

It is possible for the main body to be designed for arrangement between two flanges of the two pipe sections. In particular, it is possible for the main body to be designed as a sandwich flange. It is possible for the main body to have integral fastening holes, in particular threaded holes. It is also possible for the main body to have a smaller diameter than the flanges of the pipe sections, thus allowing it to be clamped between the pipe sections, by screwing the two flanges of the pipe sections together radially to the outside of the main body and thus clamping the main body between them.

The measuring device, which, in particular, is arranged as a measuring flange at a separating point of a combustible gas line, achieves significantly enhanced safety since all the sealing components, in particular O-rings, are fully covered by the measuring flange. In this context, FPM/FKM elastomers (fluorinated rubber) can be used as materials for O-ring seals, these having a reliable operating range of −20° C. to 200° C. and also up to 230° C. for short periods. A very low leakage rate, even in the event of fire if the O-rings are destroyed, is obtained since, in addition to the O-ring sealing, full metal contact between the ends of the flange connection, in particular by virtue of the screwed flange joint, is maintained. The degree of overlap of the metal contact surfaces between the ends of the measuring device, on the one hand, and, in particular, flanges of pipe sections, on the other hand, satisfies requirements in respect of effective gap lengths and requirements in respect of minimum gap widths. As already explained, the seals can cover large temperature ranges specified by classification societies, in particular those for classifying maritime applications of internal combustion engines.

It is possible for the measuring device—preferably including flanges of pipe sections to which the measuring device is connected—to be covered with a fire protection sleeve. In particular, it is possible for a complete fitting comprising the measuring device to be covered with a fire protection sleeve.

According to a development of the invention, it is envisaged that the main body can be assigned an additional sensor device, which can be brought into operative connection with the at least one second aperture. In this way, a physical property, in particular a thermodynamic state variable, of a fluid arranged in the second aperture can also be detected. The main body is preferably assigned an additional sensor device which is in operative connection with the at least one second aperture. In particular, an additional pressure sensor for measuring the inert gas pressure or purging air pressure in the second aperture can be provided.

The measuring device equipped with the at least one sensor device can be checked separately, independently of a line or combustible gas supply device, in particular in respect of its ability to function, acceptance and/or ratification. Electrical connections of the at least one sensor device are situated outside a zone at risk of explosion, thus enabling the at least one sensor device to be provided with a sensor connection plug. This too contributes to the fact that the measuring device overall—including the sensor device—can be constructed in an inexpensive and simple way, wherein, in particular, it is possible to use an inexpensive sensor device.

The object is also achieved by providing a combustible gas supply device for an internal combustion engine which has a combustible gas line that is double-walled, at least in some region or regions. The combustible gas line is assigned a measuring device in accordance with one of the illustrative embodiments described above. In particular, the advantages which have already been explained in connection with the measuring device are obtained in connection with the combustible gas supply device. In particular, the combustible gas supply device preferably has the measuring device in accordance with one of the illustrative embodiments described above. In this case, the combustible gas supply device preferably has two pipe sections, wherein the measuring device is arranged between the pipe sections and connects said pipe sections to one another. In particular, the main body of the measuring device is preferably designed as a flange, whereby the measuring device itself is preferably designed as a measuring flange, wherein the measuring device is arranged between flanges of the pipe sections of the combustible gas line.

Finally, the object is also achieved by providing an internal combustion engine which has a combustible gas supply device in accordance with one of the illustrative embodiments described above. In particular, the advantages which have already been explained in connection with the combustible gas supply device and/or the measuring device are obtained in connection with the internal combustion engine.

The internal combustion engine is preferably designed as a reciprocating piston engine. It is possible for the internal combustion engine to be configured to drive an automobile, a heavy goods vehicle or a commercial vehicle. In a preferred illustrative embodiment, the internal combustion engine is used, in particular, to drive heavy land vehicles or watercraft, e.g. mine vehicles, trains, wherein the internal combustion engine is used in a locomotive or motor car, or ships, Use of the internal combustion engine to drive a vehicle used for defense, e.g. a tank, is also possible. One illustrative embodiment of the internal combustion engine is preferably also used for stationary applications, e.g. for stationary power supply in emergency power operation, continuous load operation or peak load operation, wherein, in this case, the internal combustion engine preferably drives a generator. Stationary application of the internal combustion engine to drive auxiliary units, e.g. fire extinguishing pumps on drilling platforms, is also possible, Application of the internal combustion engine in the sector of delivering fossil-based raw materials and, especially, fuels, e.g. oil and/or gas, is furthermore possible. Use of the internal combustion engine in the industrial sector or in the construction sector, e.g. in a construction or building machine, e.g. in a crane or an excavator, is also possible. The internal combustion engine is preferably designed as a diesel engine, as a gasoline engine, as a gas engine for operation with natural gas, biogas, special gas or some other suitable gas. Particularly if the internal combustion engine is designed as a gas engine, it is suitable for use in a combined heat and power plant for stationary power generation.

As a particular preference, the internal combustion engine is designed as a gas engine, in particular for marine applications, or for stationary applications. In particular, the internal combustion engine can be used to propel a ship or can be designed as a marine propulsion system.

In particular, the internal combustion engine is configured for operation with at least one combustible gas as a fuel, wherein the internal combustion engine is preferably configured for operation with a methane-containing combustible gas as a fuel, in particular natural gas, LNG (liquefied natural gas), CNG (compressed natural gas) or the like.

BRIEF DESCRIPTION OF THE DRAWING

The invention is explained in greater detail below with reference to the drawing, in which:

FIG. 1 shows an illustration of one illustrative embodiment of a measuring device, and FIG. 2 shows a section through the measuring device in FIG. 1.

DETAILED DESCRIPTION OF THE INVENTION

FIG. 1 shows a first illustration—in plan view—of one illustrative embodiment of a measuring device 1 for measuring at least one physical property of a fluid, Measuring device 1 has a main body 3 which is closed along a peripheral line, wherein the main body 3, which is here seen in plan view, is of circular design and, in particular—as can be seen from FIG. 2—is designed as a circular disk. The imaginary peripheral line along which the main body 3 is of closed design is thus a circular line which extends in the plane of FIG. 1.

The main body 1 has a first aperture 5 passing through it in the axial direction, which is here designed as a central hole, in particular as a circular central hole. The axial direction is perpendicular to the plane of FIG. 1. In particular, the aperture 5 is designed as a through hole.

The main body 3 furthermore has at least one, in this case precisely eight, second apertures 7, which likewise pass through the main body 1 in the axial direction. The second apertures 7 are arranged radially to the outside of the first aperture 5, wherein, in particular, they are arranged symmetrically around the first aperture 5—when viewed in the peripheral direction—in particular therefore being arranged concentrically at uniform angular intervals around the first aperture 5 on an imaginary peripheral line. The second apertures 7 are likewise designed as through holes. They each have a smaller passage cross section than the first aperture 5, wherein, in particular, they have a smaller diameter than the first aperture 5—since they are of circular design.

The second apertures 7 are fluidically separated from the first aperture 5 and therefore there is no fluid path within the main body 3 between the second apertures 7 and the first aperture 5.

The main body 3 is assigned at least one sensor device, wherein, in the specific illustrative embodiment shown here, it is assigned two sensor devices 9, 11, namely a pressure sensor 13 as a first sensor device 9 and a temperature sensor 15 as a second sensor device 11. Both sensor devices 9, 11 are in operative connection with the first aperture 5. By means of the sensor devices 9, 11, physical properties of a fluid which is arranged in the first aperture 5 and, in particular, flows through the first aperture 5 can accordingly be measured. In this case, it is, in particular, the thermodynamic state variables of the fluid which can be measured here as physical properties, namely a temperature by means of the temperature sensor 15 and a pressure of the fluid by means of the pressure sensor 13.

The main body 3 has two ends, namely a first end 17, which is illustrated in FIG. 1 and faces the observer, and a second end 19, which faces away from the first end 17 in the axial direction, faces away from the observer in FIG. 1 and is therefore not illustrated. The second end 19 is illustrated in FIG. 2, however. The apertures 5, 7 are designed as through holes and therefore open into the first end 17, on the one hand, and into the second end 19, on the other hand.

In the illustrative embodiment shown here, first sealing devices 21, in particular in the form of first O-rings 25 arranged in first annular grooves 23, are arranged on both ends 17, 19, between the first aperture 5 and the second apertures 7 when viewed in the radial direction, wherein the first annular grooves 23 are arranged concentrically with the first aperture 5, on the one hand, and with the arrangement of the second apertures 7, on the other hand. In particular, the first sealing devices 21 are thus designed as encircling sealing devices. By means of said sealing devices, the second apertures 7 can be sealed with respect to the first aperture 5 in the mounted state of the measuring device 1.

In the illustrative embodiment shown here, first fluid connections 27 between the second apertures 7 are formed at both ends 17, 19. Here, the first fluid connections 27 are achieved, in particular, by means of a second annular groove 29 on each end 17, 19, the groove being of encircling design when viewed in the peripheral direction and being arranged concentrically with the first aperture 5, on the one hand, and with the arrangement of the second apertures 7, on the other hand, in such a way that the second apertures 7 open into the second annular groove 29, wherein the second annular groove 29 connects the second apertures 7 fluidically to one another. As an alternative—especially when the main body 3 is produced by a generative process—it is also possible for a second fluid connection arranged in the interior of the main body 3 to be provided between the second apertures 7. This can be designed as an annular channel, for example, which extends concentrically around the first aperture 5 and connects the second apertures 7 fluidically to one another.

In the illustrative embodiment shown here, a second sealing device 31 is furthermore arranged radially to the outside of the second apertures 7 on each of the two ends 17, 19, said sealing device likewise being achieved by means of a third annular groove 33 and of a second O-ring 35 arranged therein. In this case, the third annular groove 33 of the second sealing device 31 also extends concentrically both with respect to the first aperture 5 and with respect to the arrangement of the second apertures 7 and—when viewed in the peripheral direction—is of encircling design.

The main body 3 has a first radial hole 37 to receive the first sensor device 9. In particular, this first radial hole 37 is designed as a stepped hole, wherein it has a threaded section 39 which has an internal thread, with which an external thread on the first sensor device 9 meshes. Thus, in particular, the pressure sensor 13 is screwed into the first radial hole 37. In this case, a sealing device 41 in the form of a contact surface and of a fourth O-ring 42 interacting therewith, which, in particular, seals off the threaded section 39 with respect to the outside, is provided in a manner known per se on the first radial hole 37.

The main body 3 has a first radial hole 43, which is provided to receive the second sensor device 11, This too is preferably designed as a stepped hole. The second sensor device 11 too is preferably likewise screwed into the second radial hole 43, at least in some region or regions. However, it is also possible for the second sensor device 11 to be glued, brazed or welded into the second radial hole or fastened therein in some other suitable manner.

The temperature sensor 15 provided as the second sensor device 11 has a protective sleeve 45. This sleeve is arranged leaktightly in the second radial hole 43, e.g. by suitable arrangement of at least one fifth O-ring or by welding, gluing, brazing or the like, with the result that there is no fluid connection from the first aperture 5 radially to the outside via an edge of the protective sleeve 45. At the same time, the protective sleeve 45 fluidically separates an interior of the temperature sensor 15 from the first aperture 5. The interior of the protective sleeve 45, for its part, is sealed off from an external environment of the measuring device 1. The temperature sensor 15 thereby implements a double-walled seal for the interior of the first aperture 5 with respect to an exterior of the measuring device 1.

FIG. 2 shows a section through the illustrative embodiment of the measuring device 1 shown in FIG. 1. Identical and functionally identical elements are provided with the same reference signs and, to this extent therefore, attention is drawn to the preceding description. In particular, the section plane in FIG. 2 is chosen so that the first sensor device 9 and hence the pressure sensor 13 is illustrated. It becomes clear here that the first radial hole 37 is in fluid connection with the second apertures 7, in this case, in particular, via a stub hole 47 as a second fluid connection, which opens, on the one hand, into the first radial hole 37 and, on the other hand, into the second annular groove 29 of the first fluid connection 27 between the two apertures 7. It is possible, in a similar way, for the second radial hole 43 also to be in fluid connection with at least one of the second apertures 7. In particular, the second radial hole 43 can also be connected by a corresponding stub hole to the second annular groove 29.

Via such a stub hole 47, fluid can flow across from the first aperture 5, via the first radial hole 37 and stub hole 47, into the second annular groove 29 and hence into the second apertures 7 in the case of a leak in the region of a sensor device, in this case, in particular, in the region of the first radial hole 37, or the first radial hole 37 can be purged by fluid flowing in the second apertures 7, wherein this fluid—if it is under a higher pressure than the fluid arranged in the first aperture 5—can also get into the first aperture 5 via the first radial hole 37.

The pressure sensor 13 is preferably designed as an absolute pressure sensor. In this case, it has a measuring diaphragm 49 and a supporting space 51, wherein the measuring diaphragm 49 is subjected on one side to pressure in the first aperture 5, wherein the pressure prevailing in the supporting space 51 is applied on the other side of the measuring diaphragm 49. The supporting space 51 is preferably evacuated or contains an inert gas, e.g. nitrogen, under low pressure, in particular below the normal pressure of 1013 mbar. The supporting space 51 provides a second chamber radially to the outside of the first aperture 5 in the region of the pressure sensor 13 as well, with the result that the pressure sensor 13 itself implements the principle of double-walled sealing of the first aperture 5.

FIGS. 1 and 2 show that the main body 3 is designed as a flange for arrangement between two pipe sections, wherein, in particular, the measuring device 1 overall is designed as a measuring flange. In particular, when viewed in the axial direction, the main body 3 is preferably arranged between two pipe sections, which each have a first chamber and a second chamber, wherein the first chamber is fluidically separated from the second chamber, and wherein the first aperture 5 is provided to fluidically connect the first chambers of the pipe sections, and wherein the second apertures 7 are designed to fluidically connect the second chambers of the pipe sections to one another. Pipe sections of this kind are therefore of double-walled design and have chambers—in particular chambers arranged concentrically with one another—in which different fluids are arranged. In particular, a combustible or explosive first fluid is preferably carried in an inner, first chamber, wherein an inert gas or purging air is carried in a radially outer, second chamber. This double-walled construction is continued via the main body 3 of the measuring device 1 and is also retained in the region of the sensor devices 9, 11. Particularly the electric or electronic parts thereof are here preferably arranged outside the double-walled structure, and therefore they do not have to be of explosion-protected design. It is therefore possible to use simple and inexpensive sensor devices 9, 11.

The pipe sections between which the main body 3 is arranged can have flanges that have a larger diameter than the main body 3. The main body can then be clamped between the flanges of the pipe sections by clamping, in particular screwing, the flanges of the pipe sections to one another radially to the outside of the main body 3. During this process, the flanges clamp the main body 3 between them. However, it is also possible for the main body 3 itself to have fastening devices (not shown here), in particular threaded holes, via which it can be connected to the flanges of the pipe sections.

It is possible for the measuring device 1 to have an additional sensor device which is arranged on the main body 3 and is in operative connection with the second apertures 7, in particular with at least one of the second apertures 7, thus allowing at least one physical property of a fluid arranged in the second apertures 7 to be measured by means of this additional sensor device.

In particular, the measuring device 1 is provided for arrangement in a combustible gas supply device for an internal combustion engine, which has a double-walled combustion gas line, at least in some region or regions. Here, the measuring device 1 is assigned to this combustible gas line which is double-walled, at least in some region or regions. In particular, the measuring device 1 is preferably arranged between flanges of the combustible gas line which is double-walled, at least in some region or regions.

The invention also includes an internal combustion engine (not shown here) which has a combustible gas supply device that has a combustible gas line which is double-walled, at least in some region or regions, and, for its part, once again has the measuring device 1. In particular, the internal combustion engine can be designed as a V or W engine, wherein, in particular, it has different cylinder banks. It is possible for each cylinder bank to be assigned a separate measuring device 1, but it is also possible for the combustible gas supply device as a whole to be assigned just one measuring device 1.

Overall, it is found that the measuring device 1 proposed here, the combustible gas supply device and the internal combustion engine provide a mechanically simple and inexpensive way of measuring physical properties of combustible and/or explosive fluids in a double-walled line system, wherein, in particular, inexpensive sensor devices 9, 11 without explosion protection can be used.

The invention claimed is:

1. A measuring device for measuring a physical property of a fluid, comprising:
   a main body that is closed along a peripheral line and which has a first aperture that passes through the main body in an axial direction, wherein the axial direction is a direction in which the fluid flows through the main body, wherein the main body has at least two second apertures that pass through the main body in the axial direction parallel to the first aperture; and
   at least one sensor device for measuring a physical characteristic of the fluid, the at least one sensor device being arranged in the first aperture, wherein the main body has two ends, namely a first end and a second end, which when viewed in the axial direction faces away from the first end, wherein the first aperture and the at least two second apertures open into the first and second ends, wherein a first fluid connection is provided at at least one of the first and second ends so as to provide communication between the at least two second apertures, the first fluid connection being configured as a groove.

2. The measuring device according to claim 1, wherein the at least two second apertures are a plurality of the second apertures.

3. The measuring device according to claim 2, wherein the plurality of second apertures is arranged around the first aperture.

4. The measuring device according to claim 1, wherein a first sealing device is arranged on at least one of the two ends between the first aperture and the at least two second apertures when viewed in a radial direction.

5. The measuring device according to claim 4, wherein the main body has at least one radial hole to receive the at least one sensor device.

6. The measuring device according to claim 5, further comprising at least one second fluid connection between the at least one radial hole and the at least two second apertures.

7. The measuring device according to claim 1, wherein the at least one sensor device is a pressure sensor and/or a temperature sensor.

8. The measuring device according to claim 1, wherein the main body is a flange arrangeable between two pipe sections that each have a first and a second chamber, wherein the first chamber is fluidically separated from the second chamber, wherein the first aperture is designed for fluid connection of the first chambers of the pipe sections, and wherein at least one of the at least two second apertures is designed for fluid connection of the second chambers of the pipe sections.

9. The measuring device according to claim 1, further comprising an additional sensor device arranged in the main body so as to be in operative connection with the at least one second aperture.

10. The measuring device according to claim 1, wherein a second sealing device is arranged radially outside the at least two second apertures at at least one of the two ends.

11. A combustible gas supply device for an internal combustion engine, comprising: a combustible gas line which is double-walled at least in one region; and a measuring device assigned to the combustible gas line, the measuring device including a main body that is closed along a peripheral line and which has a first aperture that passes through the main body in an axial direction, wherein the axial direction is a direction in which the fluid flows through the main body, wherein the main body has at least two second apertures that pass through the main body in the axial direction parallel to the first aperture; and at least one sensor device for measuring a physical characteristic of the fluid, the at least one sensor device being arranged in the first aperture, wherein the main body has two ends, namely a first end and a second end, which when viewed in the axial direction faces away from the first end, wherein the first aperture and the at least two second apertures open into the first and second ends, wherein a first fluid connection is provided at at least one of the first and second ends so as to provide communication between the at least two second apertures, the first fluid connection being configured as a groove.

12. An internal combustion engine, comprising a combustible gas supply device including a combustible gas line which is double-walled at least in one region; and a measuring device assigned to the combustible gas line, the measuring device including a main body that is closed along a peripheral line and which has a first aperture that passes through the main body in an axial direction, wherein the axial direction is a direction in which the fluid flows through the main body, wherein the main body has at least two second apertures that pass through the main body in the axial direction parallel to the first aperture; and at least one sensor device for measuring a physical characteristic of the fluid, the at least one sensor device being arranged in the first aperture, wherein the main body has two ends, namely a first end and a second end, which when viewed in the axial direction faces away from the first end, wherein the first aperture and the at least two second apertures open into the first and second ends, wherein a first fluid connection is provided at at least one of the first and second ends so as to provide communication between the at least two second apertures, the first fluid connection being configured as a groove.

\* \* \* \* \*